United States Patent [19]

Stock

[11] Patent Number: 4,675,764

[45] Date of Patent: Jun. 23, 1987

[54] DRIVE MECHANISM FOR A MAGNETIC HEAD CARRIAGE ASSEMBLY

[75] Inventor: Helmut Stock, Hildrizhausen, Fed. Rep. of Germany

[73] Assignee: International Business Machines Corporation, Armonk, N.Y.

[21] Appl. No.: 766,856

[22] Filed: Aug. 16, 1985

[30] Foreign Application Priority Data

Aug. 17, 1984 [EP] European Pat. Off. ........ 84109777.7

[51] Int. Cl.$^4$ ......................... G11B 5/55; G11B 21/06

[52] U.S. Cl. ........................................ 360/106; 360/2; 360/137

[58] Field of Search ........................ 360/106, 104–105, 360/2, 137

[56] References Cited

U.S. PATENT DOCUMENTS

| | | | |
|---|---|---|---|
| 3,572,489 | 3/1971 | Schaefer | 197/82 |
| 3,859,662 | 1/1975 | Habich et al. | 360/106 |
| 4,121,226 | 10/1978 | Alden | 346/139 |
| 4,263,632 | 4/1981 | Burke, Jr. et al. | 360/106 |
| 4,310,865 | 1/1985 | Kohl et al. | 360/106 |
| 4,358,805 | 11/1982 | Stemme et al. | 360/106 |
| 4,395,151 | 7/1983 | Krenz | 400/320 |
| 4,399,477 | 8/1983 | Bryer | 360/106 |

*Primary Examiner*—John H. Wolff

*Attorney, Agent, or Firm*—Karl O. Hesse

[57] ABSTRACT

A drive mechanism for driving a magnetic band, print head, or a similar carriage assembly which is movable on parallel guide rods by a band or cable loop. The drive unit consists of a drive motor and a drive pulley. The drive unit is also movable on the parallel guide rods and supported through a spring element to produce the band or cable tension, while the deflecting pulley or idler pulley is rigidly supported in the frame.

4 Claims, 3 Drawing Figures

Fig. 1
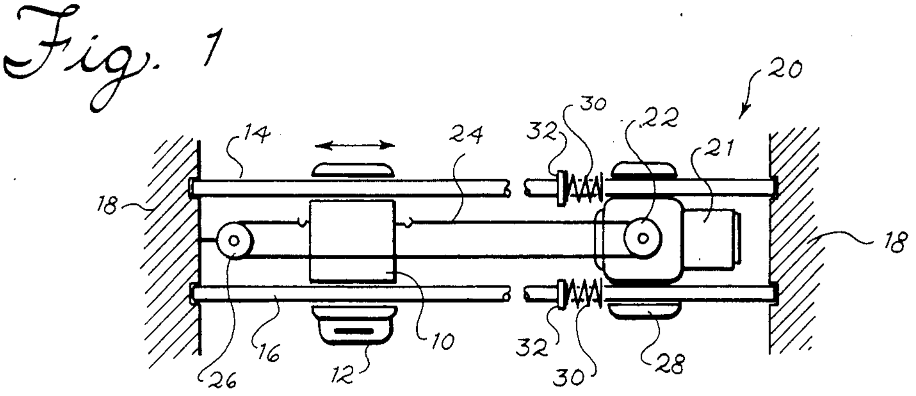
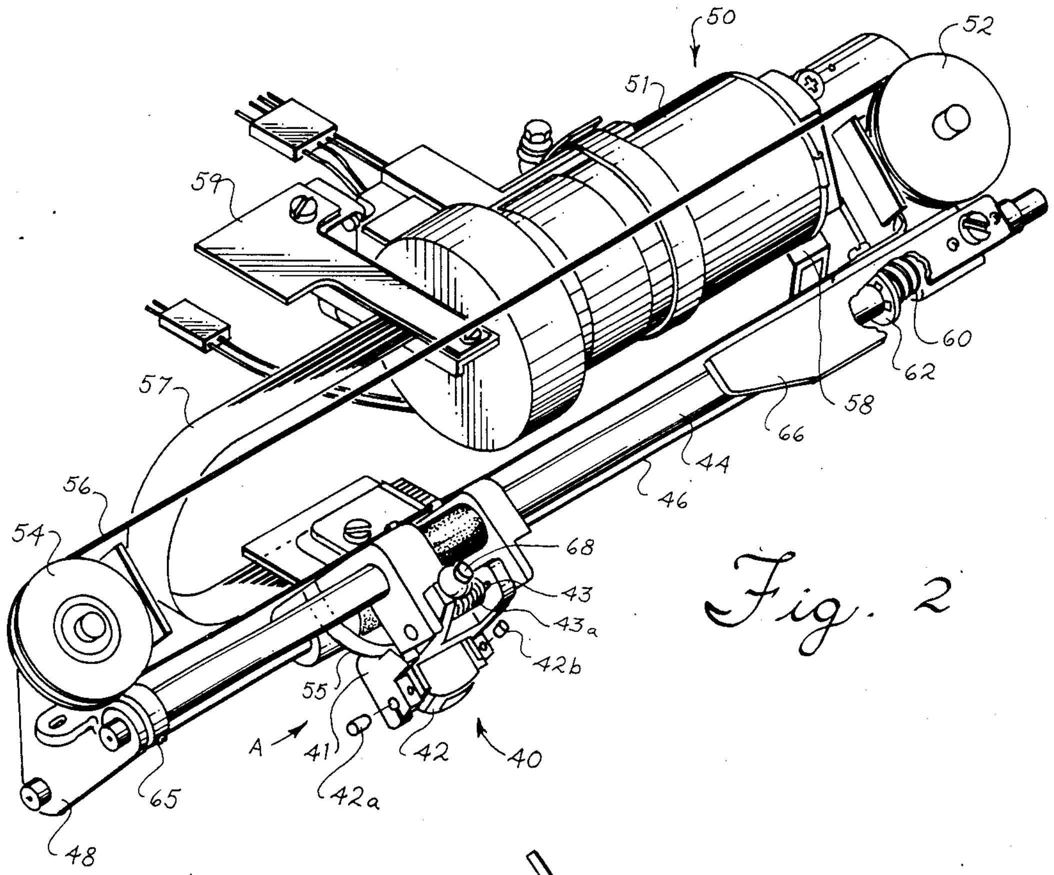
Fig. 2
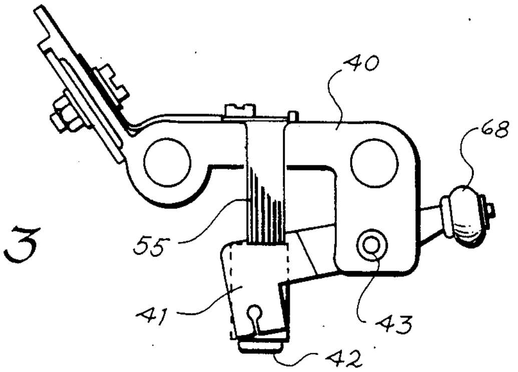
Fig. 3

DRIVE MECHANISM FOR A MAGNETIC HEAD CARRIAGE ASSEMBLY

FIELD OF THE INVENTION

This invention relates to a drive mechanism for a magnetic stripe reader-encoder carriage assembly.

BACKGROUND OF THE INVENTION

The invention concerns a drive mechanism for a magnetic stripe reader-encoder head or print head carriage assembly which is movable along at least one linear guide rod or track by a drive band or cable. The cable is mounted on a drive pulley positioned in the frame at one side of the carriage assembly and a deflecting pulley positioned in the frame at the other side of the carriage. The drive band or cable is driven by a drive unit, consisting of a drive motor and power transmission connected to the drive pulley.

In such mechanisms, the drive unit is generally fixed to the frame and the deflecting pulley is flexibly guided for generating and maintaining the band or cable tension and so that tensile stresses to which the band may be subjected by temperature fluctuations or prolonged operation are simultaneously compensated for.

Very stringent constant speed requirements have to be observed for magnetic head carriages for recording and sensing signals on magnetic records. Even the print quality of printers depends to a considerable degree on the accuracy of the incremental motion of the type carriage. For instance, DIN (German Industrial Standard) 32 744 specifies bit spacings of 0.121 mm for magnetic stripes at a permissible tolerance of ±5%, which corresponds to an accuracy of 0.0061 mm. Hitherto, an accuracy of that order has been unobtainable with conventional arrangements. This is mainly due to the fact that the carriage guide is adversely affected, for instance, by the incremental motions of the carriage or by oscillations produced by power transmission gears, which oscillations are transferred to the frame, or to the further fact that the compensating movements of the deflecting pulley, acting as a tensioning pulley, impair the speed constancy of the carriage. Compensating movements are performed, for example, in conjunction with type carrier impact motions or uneven paths, as are encountered by the magnetic head as it moves across bookkeeping journals, savings books, etc.

SUMMARY OF THE INVENTION

It is the object of the invention to remedy this situation in the prior art by designing the above-described drive mechanism such that the longitudinal movements of the carriage are performed at a substantially increased constancy of speed and with a much higher accuracy of incremental motion.

This object is accomplished by the mechanism according to the invention, in which the entire drive system, consisting of the drive motor, power transmission, and the drive pulley is designed as a mass that is flexibly positioned in the direction of carriage movement. Any detrimental longitudinal forces and high-frequency oscillations emanating from the drive system are absorbed by the spring-mass system formed by the flexibly positioned drive unit and its mounting springs. In this way, only low-frequency oscillation forces, if any, are transferred by the mounting springs and guide rods to the housing. For that purpose, the mass of the drive unit acts as a damping means, and the carriage movement remains unaffected by such detrimental forces.

Thus, in the mechanism according to the invention, any forces occurring in the direction of carriage movement, such as the band or cable tension, the thrust, the acceleration and deceleration of the carriage, form a closed loop system and are transferred to the frame as reaction forces by the support, i.e., the guide rods and the spring elements. In preferred embodiments of the invention, the drive unit is guided on one guide rod or two parallel guide rods to be torsion-resistant and is supported through pressure springs on retainers provided on the guide rods.

The invention will be described in the following specification by means of drawings both with respect to its operating principle and by way of a preferred embodiment.

BRIEF DESCRIPTION OF THE DRAWINGS

FIG. 1 is a schematic of the operating principle of the invention;,

FIG. 2 shows an application of the invention to the drive unit of a savings passbook printer having a print head and a magnetic stripe reader-encoder head mounted on a carriage for reading or recording the information which has been or is to be printed, and FIG. 2A is a detail view in the direction A of FIG. 2.

DESCRIPTION OF A PREFERRED EMBODIMENT

FIG. 1, shows a carriage 10 with a magnetic head 12 longitudinally movable on two parallel guide rods 14, 16. Both ends of the guide rods 14, 16 are supported in a frame 18. For driving the carriage 10 along the guide rods 14, 16, i.e., in the direction of the double-arrow, a drive unit 20, consisting of a geared motor 21 with a drive pulley 22, is used. The geared motor 21 and the carriage 10 are drivingly connected by a cable 24. The latter is guided across the drive pulley 22 and a deflecting pulley 26, supported on the opposite end in the frame 18, and its ends are fixed to the carriage 10, so that a closed loop of drive cable is obtained.

By means of a motor carriage 28, the geared motor 21 is also longitudinally movable on the guide rods 14, 16. The geared motor is supported through two pressure springs 30 on two retainers 32 which are fixed to the guide rods 14 and 16. Thus, the cable 24 is kept at a particular tension by the pressure springs 30, so that changes in its length, resulting from tensile stresses or temperature fluctuations, are automatically compensated for.

The polarity of the geared motor 21 is reversible. In response to the control signals applied, the geared motor causes the carriage 10 to be continuously or incrementally reciprocally moved along a predetermined path. Vibrations occurring in the geared motor 21 during that process or similar detrimental forces in the direction of the guide rods 14, 16 are effectively damped by the mass of the drive unit 20 and, unless having been absorbed by the flexibly positioned mass of the drive unit 20, are transferred through pressure springs 30 to the guide rods 14, 16 and from there to the frame 18, without impairing the movement of the carriage 10. As the deflecting pulley 26 is rigidly supported in the frame 18, it does not respond to transverse forces acting on the carriage 10, for example, when the magnetic head moves across uneven surfaces; consequently, the deflecting pulley 26 does not impair the constant speed at which the carriage is advanced, and any such transverse forces, to the extent to which they are converted by the cable 24 into longitudinal forces, are aborbed by the inertia of the geared motor 21.

Thus, with respect to longitudinally directed vibrations and detrimental forces, the geared motor 21, which is flexibly guided on the guide rods 14, 16, forms an independently vibrating spring-mass system ensuring a high degree of accuracy and speed constancy of the carriage movements.

In the assembly shown in FIG. 2 and consisting of the drive unit 50 and the magnetic head carriage guide of a savings passbook printer, the magnetic head carriage 40 with the magnetic head 42 and the geared motor 51 with the appertaining drive pulley 52 are longitudinally movable on two parallel guide rods 44, 46. Guide rods 44, 46 are supported in lateral plates 48 of the arrangement. By means of pins 42*a* with safety screws 42*b*, the magnetic head 42 is pivotably supported in a head carrier 41, whose axis 43 is pivotably guided in the magnetic head carriage 40. A spring 43*a* exerts a constant torque on the head carrier 41, so that the magnetic head 42, as it moves across the surface of a savings book, is capable of compensating for any unevenness, such as book edges and backs, thus contacting the magnetic stripe with a constant force. A flat cable group 55 connects the magnetic head carriage 40 to the magnetic head 42 and simultaneously acts as a parallel guide for the magnetic head 42 which is pivotably guided in the head carrier 41 (see also FIG. 2A). Independently of the respective pivotal position of the head carrier 41, the magnetic head 42 thus invariably retains its position parallel to the plane of the magnetic stripe. A further flat cable group 57 serves to electrically link the magnetic head carriage 40 and a holding means 59 on the geared motor 51 which in turn is connected by a cable to the machine housing. This cable system ensures that the entire arrangement shown in FIG. 2 can be replaced as one complete assembly.

For driving the magnetic head carriage 40 along the guide rods 44, 46, there is a drive unit 50 consisting of the geared motor 51 and its drive pulley 52. A cable 56, having its ends fixed to the magnetic head carriage 40 and which thus forms a closed loop system, is guided across the drive pulley 52 and a deflecting pulley 54 supported at the opposite end of the guide rods 44, 46 in the lateral plate 48. The geared motor 51 together with the drive pulley 52 is longitudinally movable on the guide rods 44, 46, being supported through one spring 60 each on a retainer 62 on the guide rods 44, 46. Retainers 62 are inserted into one annular groove each in the guide rods 44, 46, thus forming fixed stops for the springs 60. At both ends of the guide rods 44, 46, rubber damper rings 65 are provided. FIG. 2 also shows a ramp surface 66 onto which, in the region of the right end position of the magnetic head carriage 40, the magnetic head 42 is lifted from the record carrier by means of a roller 68 fixed to head carrier 41, so that the savings book may be withdrawn and a new one be inserted.

The springs 60 exert a constant force (directed towards the right in FIG. 2) on the motor carriage 58, thus ensuring that cable 56 is always tensioned. In addition, length changes of the cable 56 are automatically compensated for by the springs 60, without any readjustment being required.

As previously described by means of FIG. 1, the vibrations and detrimental forces occurring in the geared motor during the reciprocal movement of the magnetic head carriage 40 along the guide rods 44, 46 and directed parallel to said rods are damped on their very occurrence by the flexibly mounted mass of the drive unit 50 and thus are not transferred to the magnetic head carriage 40. Therefore, the adjustment speed and the positioning accuracy of the magnetic head carriage 40 are not affected by such vibrations and detrimental forces. The longitudinal detrimental forces, unless having been absorbed by the spring mass of the drive unit 50 and the springs 60, are fed as low-frequency forces by the guide rods 44, 46 and the plates 48 to the frame of the arrangement.

Thus, the motions that the drive unit 50 imparts to the magnetic head carriage 40 in the direction of the guide rods 44, 46 are performed highly accurately and remain unaffected by the detrimental forces described above. It will be recognized by those skilled in the art of magnetic stripe reader design that various substitutions can be made for the elements used in the foregoing preferred embodiment without departing from the spirit and scope of the invention which provides the improvement and that the invention is only limited by the following claims.

What is claimed is:

1. A drive mechanism for a carriage assembly, said carriage assembly being linearly movable along at least one guide means, said carriage assembly being driven by a drive unit having a drive motor and a drive pulley for driving a drive band, each end of said drive band being connected to said carriage assembly thereby forming a loop, said loop being guided over said drive pulley and a deflection pulley; the improvement comprising:

fixed mounting means for fixedly mounting said deflection pulley at one end of said guide means;

flexible mounting means at the other end of said guide means for flexibly mounting said drive unit so that said drive unit is freely movable in a direction parallel to said guide means;

tension means for moving said drive unit away from said deflection pulley with a controlled force so as to keep said drive band under tension.

2. The drive mechanism according to claim 1, wherein said drive unit is supported and guided by said guide means and said tension means is at least one spring connected between said guide means and said drive unit.

3. The drive mechanism according to claim 2 wherein said guide means is a pair of parallel guide rods, at least one guide rod having a retainer for supporting one end of said spring.

4. A drive mechanism for a carriage assembly, said carriage assembly being linearly moveable along at least one guide means, said carriage assembly being driven by a drive unit having a drive motor and a drive pulley for driving a drive band, each end of said drive band being connected to said carriage assembly thereby forming a loop, said loop being guided over said drive pulley and a deflecting pulley; the improvement comprising:

fixed mounting means for fixedly mounting said deflecting pulley at one end of said guide means;

flexible mounting means at the other end of said guide means for flexibly mounting said drive unit so that said drive unit is freely moveable in a direction parallel to said guide means;

tension means for providing a force tending to move said drive unit away from said deflecting pulley so as to keep said drive band under tension.

* * * * *